United States Patent [19]
Katcha

[11] Patent Number: 5,646,835
[45] Date of Patent: Jul. 8, 1997

[54] SERIES RESONANT CONVERTER

[75] Inventor: Jason Stuart Katcha, Shorewood, Wis.

[73] Assignee: General Electric Company, Milwaukee, Wis.

[21] Appl. No.: 559,676

[22] Filed: Nov. 20, 1995

[51] Int. Cl.[6] .................................................. H02M 7/5387
[52] U.S. Cl. .............................. 363/98; 363/17; 363/132; 324/322
[58] Field of Search ..................... 363/17, 132, 98; 324/322

[56] References Cited

U.S. PATENT DOCUMENTS

| | | | |
|---|---|---|---|
| 4,672,528 | 6/1987 | Park et al. .................................. | 363/98 |
| 5,451,878 | 9/1995 | Wirth et al. ................................ | 324/322 |

OTHER PUBLICATIONS

*Resonant Power Converter*, by Marian K. Kazimierczuk and Dariusz Czarkowski, Chapter 6, *Class D Series Resonant Inverter*, pp.149–199. ISBN 0-471-04706-6 9000.

*IEEE Transactions on Industrial Electronics*, vol. 1E-31, No. 2, May 1984, article entitled *High-Frequency Resonant Transistor DC-DC Converters*, by Robert L. Steigerwald, pp. 181–191.

*Primary Examiner*—Peter S. Wong
*Assistant Examiner*—Shawn Riley
*Attorney, Agent, or Firm*—John S. Beulick; John H. Pilarski

[57] ABSTRACT

A series resonant circuit (SRC) which includes, in one embodiment, an inverter having four (4) IGBTs is described. The SRC also includes a series coupled inductor and capacitor, a transformer, and a diode bridge. The SRC further includes a controller which utilizes, simultaneously, phase and frequency modulation in conjunction with a logarithmic amplifier to control the inverter.

23 Claims, 2 Drawing Sheets

SERIES RESONANT CONVERTER

FIELD OF THE INVENTION

The present invention generally relates to a series-resonant power converter, and more particularly, to a series-resonant converter including a controller that simultaneously utilizes frequency and phase modulation in conjunction with a logarithmic amplifier to maximize power converter efficiency and response.

BACKGROUND OF THE INVENTION

Series-resonant power converters (SRC) are generally well known. Some known SRCs utilize resonant components to minimize losses in the converter switching devices, e.g., transistors. A typical SRC includes an inverter implemented, for example, using four (4) insulated gate bipolar transistors (IGBTs). The SRC also includes a series coupled resonant inductor and capacitor, a transformer, and a diode bridge having its output coupled to a load. A controller controls the switching, or gating, of the IGBTs.

In operation, the current in the resonant inductor and capacitor resonates with a sinusoidal waveform at a frequency f where $f=\frac{1}{2}\pi(LC)^{1/2}$. As a result of this sinusoidal waveform, each IGBT changes its state, or "switches", when the current through the IGBT is near or at zero, thereby minimizing switching losses.

SRCs are utilized, for example, for supplying power to the amplifiers that control gradient magnetic field coils (or gradient coils) of a magnetic resonance (MR) imaging machine. With such MR machines, and in three-dimensional imaging, three (3) gradient coils are utilized to create time-varying gradient magnetic fields in the x, y and z dimensions. Power is supplied by the SRC to each of the gradient amplifiers. Of course, as operating conditions vary, the load demands of each amplifier also vary. Therefore, the SRC must be responsive to a variety of conditions including both low power and high power demands.

With at least one known SRC controller, the controller is implemented as a two-stage scheme to control the output power of the SRC over a wide range of loads. For example, at low output power, the controller utilizes phase modulation to control switching of the IGBTs. At high output power, the controller utilizes frequency modulation to control the IGBT switching frequency. Although such a two-phase scheme is useful for controlling the output power of the SRC, it would be desirable to provide a controller for an SRC which even more quickly responds to load changes and is more efficient. In addition, it would be desirable to improve electromagnetic interference (EMI) performance over a wide range of loads.

SUMMARY OF THE INVENTION

These and other objects and advantages are attained by an SRC including a controller which utilizes, simultaneously, phase and frequency modulation to provide power output control over a wide range of output powers. More particularly, the controller includes, in one embodiment, an error amplifier which compares the output voltage of the diode bridge with a predetermined reference voltage. The difference, i.e., error voltage, between the reference voltage and the output voltage is supplied to a logarithmic amplifier. The output of the amplifier is fed, in parallel, to a voltage controlled oscillator and to a voltage controlled phase delay. The voltage controlled oscillator determines a switching frequency for the IGBTs based on the output of the logarithmic amplifier. The voltage controlled phase delay determines a phase delay of one inverter output with respect to the other inverter output. By using, simultaneously, the voltage controlled oscillator and phase delay to control IGBT switching, the SRC quickly responds to changing load demands and is efficient. Also, good EMI performance is provided.

DETAILED DESCRIPTION OF THE DRAWINGS

Figure 1:
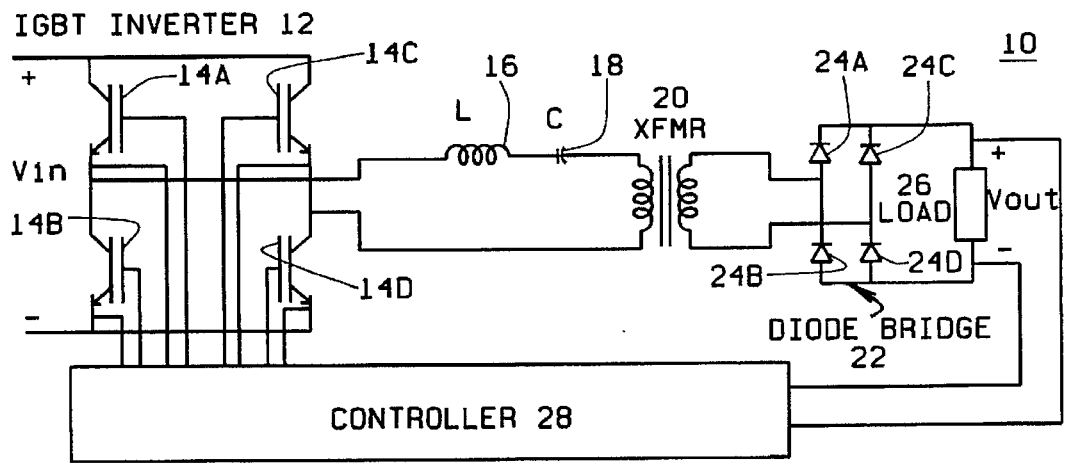
FIG. 1 illustrates, in circuit schematic form, a prior art series-resonant power converter.

A prior art series-resonant power converter (SRC) 10 is illustrated in circuit schematic form in FIG. 1. SRC 10 includes an inverter 12 implemented, for example, using four (4) IGBTs 14A–D. SRC 10 also includes a series coupled resonant inductor 16 and capacitor 18, a transformer 20, and a diode bridge 22 with four (4) diodes 24A–D. The output of diode bridge 22 is coupled to a load 26. A controller 28 is utilized to control the switching, or gating, of IGBTs 14A–D.

Controller 28 is implemented as a two-stage scheme to control the output power of SRC 10 over a wide range of loads. At low output power, controller 28 utilizes phase modulation for switching of IGBTs 14A–D. At high output power, controller 10 utilizes frequency modulation to control the switching frequency of IGBTs 14A–D.

In operation, the current in resonant inductor 16 and capacitor 18 resonates with a sinusoidal waveform at the frequency $f=\frac{1}{2}\pi(LC)^{1/2}$. Such resonation causes each IGBT 14A–D to change state, or switch, when the current through such IGBT 14A–D is near or at zero, thereby minimizing switching losses.

Figure 2:
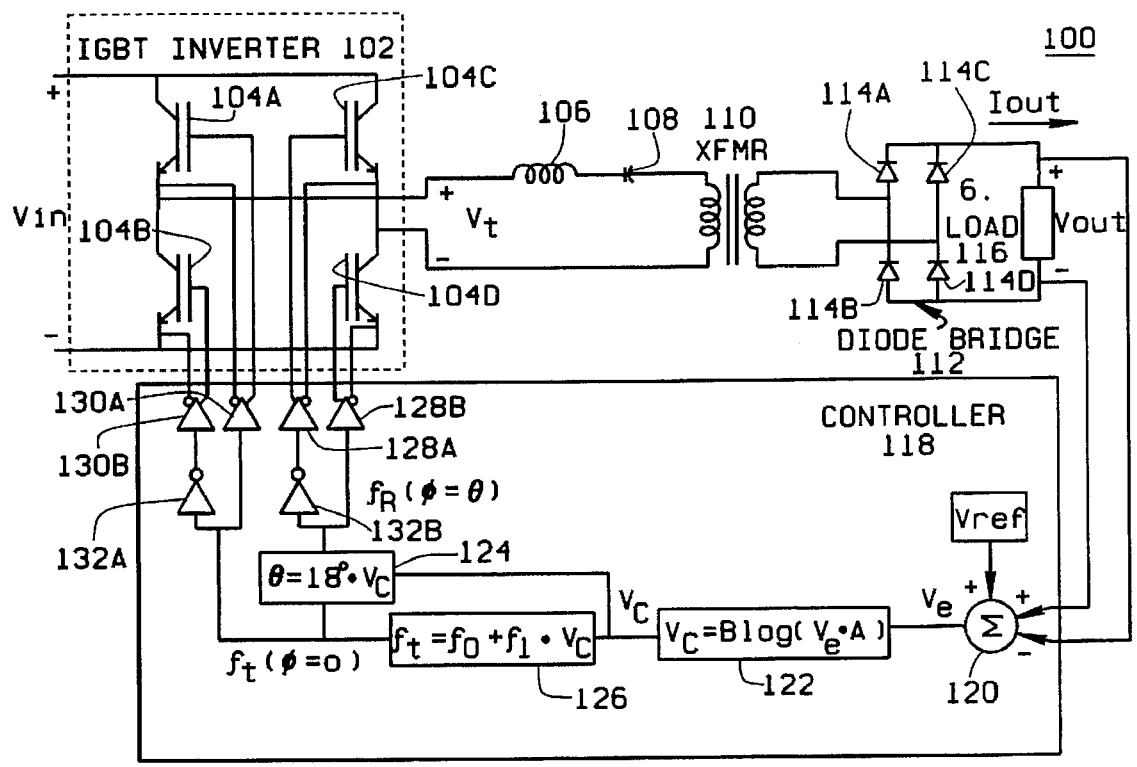
FIG. 2 illustrates, in circuit schematic form, a series-resonant power converter including a controller in accordance with one embodiment of the present invention.

An SRC 100 which provides advantages over the prior art SCR 10 is illustrated in FIG. 2. SRC 100 includes an inverter 102 having four (4) IGBTs 104A–D. SRC 100 also includes a series coupled inductor 106 and capacitor 108, transformer 110, and diode bridge 112. Diode bridge 112 includes four (4) diodes 114A–D coupled to a load 116.

SRC 100 further includes a controller 118 which utilizes, simultaneously, phase and frequency modulation to control inverter 102. More particularly, controller 118 includes, in one embodiment, an error amplifier 120 which compares the output voltage of diode bridge 112 with a predetermined reference voltage $V_{ref}$. The output of error amplifier 120 is supplied to a logarithmic amplifier 122. The output of amplifier 122 is coupled to both a voltage controlled phase delay 124 and to a voltage controlled oscillator 126. Phase delay 124 is coupled to gate drivers 128A–B. Oscillator 126 is coupled to gate drivers 130A–B. Gate drivers 128A–B and 130A–B are coupled to IGBTs 104A–D. Logic inverters 132A–B invert signals to gate drivers 128A and 130A such that IGBTs 104A and 104B are always in an opposite state (e.g., IGBT 104A is "on" and IGBT 104B is "off") and IGBTs 104C and 104D are always in an opposite state.

In operation, IGBTs 104A–D are controlled by controller 118 to provide a square-wave voltage $v_t$ that has voltage levels $\pm v_{in}$. Square-wave voltage $v_t$ has a frequency $f_t$ and duty cycle $D_t$ that are dependent upon the switching procedure of controller 118, as hereinafter described. Voltage $v_t$ is applied to the series connection of inductor (L) 106, capacitor (C) 108, and to the primary side of transformer 110. The secondary side of transformer 110 supplies a voltage to diode bridge 112 which provides load 116 with a current $I_{out}$ and produces a DC voltage $V_{out}$.

With respect to controller 118, voltage $V_{out}$ is sampled and such sample value is subtracted from a reference voltage $V_{ref}$ by error amplifier 120 to determine error voltage $V_e$. That is:

$$V_e = V_{ref} - V_{out} \quad [1]$$

Control voltage $V_c$ is determined by the logarithm of error voltage $V_e$ utilizing logarithmic amplifier 122. Particularly, control voltage $V_c$ is:

$$V_c = B \log_{10}(V_e \cdot A) \quad [2]$$

where A and B are constants.

Control voltage $V_c$ is utilized to determine the switching frequency for operation of inverter 102. Of course, the switching frequency of inverter 102 also is the frequency $f_t$ of the square-wave voltage $V_t$. Voltage controlled oscillator 126 determines frequency $f_t$ as follows:

$$f_t = f_0 + f_1 \cdot V_c \quad [3]$$

where $f_0 = \frac{1}{2}\pi(LC)^{1/2}$ and $f_1$ is a positive constant.

Control voltage $V_c$ also is utilized, by voltage controlled phase delay 124, to determine phase delay θ for the switching of IGBTs 104C and 104D with respect to the switching of IGBTs 104A and 104B. Specifically, phase delay θ is equal to 18°·$V_c$. By controlling the phase delay of IGBTs 104A–D as set forth above, duty cycle $D_t$ of square wave voltage $V_t$ is:

$$D_t = \frac{180° - 18° \cdot V_c}{180°} \cdot 100\% \quad [4]$$

As a specific example, and for the following conditions, output current $I_{out}$ will approximate an exponential function of $V_c$. Specifically, for the following conditions:
L=32[μH],
C=2[μF],
$f_1$=4[kHz],
$V_{in}$=290[V],
$V_{out}$=180[V], and
XFMR=1:1,
output current $I_{out}$ will approximate:

$$I_{out} = \frac{220[A]}{10^{\frac{V_c[V]}{3.6}}} \quad [5]$$

Substituting equation 2 into equation 5, with B=−3.6, yields:

$$I_{out} = 220 \cdot A \cdot V_e \quad [6]$$

As shown above in the specific example, $I_{out}$ is a linear function of $V_c$. Therefore, constant A can easily be chosen so that controller 118 provides the optimum response over the entire range of output power.

Figure 3:
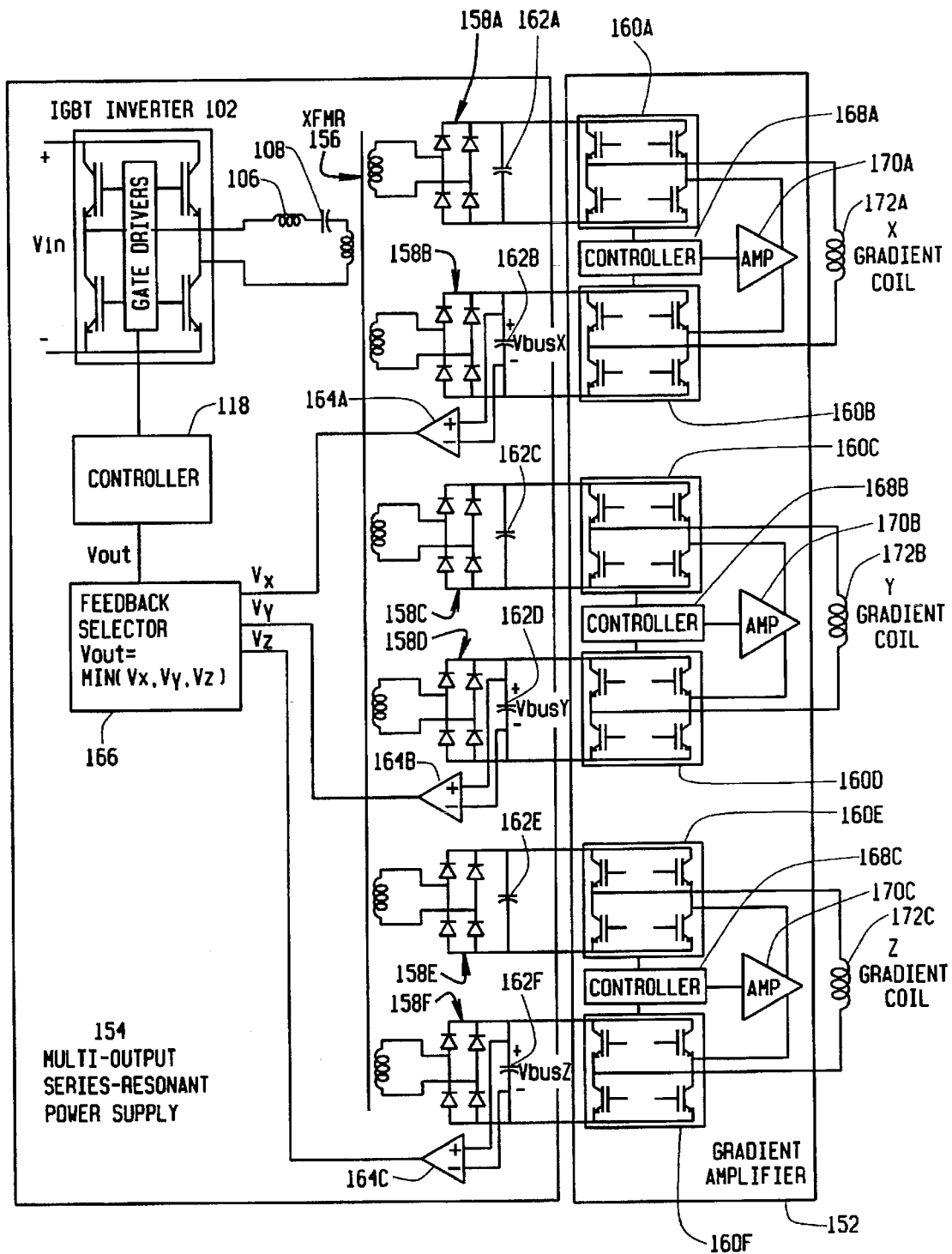
FIG. 3 illustrates, in circuit schematic form, a series-resonant power converter in accordance with another embodiment of the present invention.

FIG. 3 illustrates another embodiment of an SRC in accordance with the present invention. Components shown in FIG. 3 which are the same as the components shown in FIG. 2 are referenced in FIG. 3 using the same reference numerals as used in FIG. 2. Referring specifically to FIG. 3, a gradient amplifier 152 is shown coupled to a multi-output series-resonant power supply, or SRC, 154. SRC 154 includes a six output transformer 156 coupled to six diode bridges 158A–F. Diode bridges 158A–F are coupled to respective inverters 160A–F of gradient amplifier 152. Capacitors 162A–F are coupled across the outputs of respective diode bridges 158A–F. Voltage signals developed across capacitors 162B, 162D and 162F are coupled to respective difference amplifiers 164A–C. The outputs of difference amplifiers 164A–C are supplied to a feedback selector 166.

Gradient amplifier 152 controllers 168A–C which control switching of inverters 160A–B. Controllers 168A–C supply control signals to amplifiers 170A–C, and the outputs of amplifiers 170A–C are in series with the outputs of inverters 160A–F. Each inverter pair 160A,B, 160C,D, and 160E,F supplies a positive voltage and a negative voltage to a respective gradient coil 172A–C. Gradient coils 172A–C may, for example, be the coils of an MR imaging machine. The operation of gradient amplifier 152 and gradient coils 172A–C is explained in U.S. Pat. No. 5,451,878, Non-Resonant Gradient Field Accelerator, which is assigned to the present assignee and incorporated herein, in its entirety, by reference.

With respect to operation of SRC 154, voltage signals developed across capacitors 162B, 162D and 162F are supplied, via difference amplifiers 164A–C, to feedback selector 166. Feedback selector 166 compares the voltage magnitudes received from such amplifiers 162B, 162D, and 162F, and supplies the lowest, or MIN, voltage magnitude level as an input to controller 118. Controller 118 operates as described above to control switching of inverter 102.

The above described SRC, by simultaneously using the voltage controlled oscillator and phase delay to control IGBT gating, responds quickly to changing load demands and is efficient. Also, good EMI performance is provided.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, the load does not necessarily have to be the gradient coils of an MR imaging machine. The subject SRC may be utilized in connection with supplying power to may other types of loads. Accordingly, the spirit and scope of the invention are to be limited only by the terms of the appended claims.

What is claimed is:

1. A series resonant power converter for supplying power in a magnetic resonance imaging machine, said converter comprising:

an inverter;

an inductor coupled to the output of said inverter;

a capacitor coupled in a series with said inductor;

a transformer having a primary side and a secondary side, said capacitor coupled to said primary side of said transformer;

a diode bridge coupled to said secondary side of said transformer, an output of said diode bridge coupled to at least one amplifier for coupling to a gradient coil of the magnetic resonance imaging machine; and a controller coupled to the output of said diode bridge and configured for controlling, substantially simultaneously, both the frequency and phase delay of said inverter.

2. A series resonant power converter in accordance with claim 1 wherein said inverter comprises four insulated gate bipolar transistors.

3. A series resonant power converter in accordance with claim 1 wherein said diode bridge comprises four diodes.

4. A series resonant power converter in accordance with claim 1 wherein said controller comprises an error amplifier which compares the output voltage $V_{out}$ of said diode bridge with a predetermined reference voltage $V_{ref}$.

5. A series resonant power converter in accordance with claim 4 wherein said controller further comprises a logarithmic amplifier, the output of said error amplifier being coupled to said logarithmic amplifier.

6. A series resonant power converter in accordance with claim 5 wherein the output of said logarithmic amplifier is coupled to a voltage controlled phase delay and to a voltage controlled oscillator.

7. A series resonant power converter in accordance with claim 6 wherein said phase delay and said oscillator are coupled to a plurality of gate drivers, said gate drivers being coupled to said inverter.

8. A method for controlling gating of switches forming an inverter, the inverter being a component of a series resonant power converter including a series coupled inductor having an inductance L and capacitor having a capacitance C, the converter further including a diode bridge coupled to the series inductor and capacitor, the output $V_{out}$ of the diode bridge being the power converter output, said method comprising the steps of:

sampling voltage $V_{out}$;

subtracting voltage $V_{out}$ from a reference voltage $V_{ref}$ to obtain an error voltage $V_e$;

determining a control voltage $V_c$ by determining the logarithm of error voltage $V_e$ utilizing the relationship:

$$V_c = B \log(V_e \cdot A)$$

where A and B are constants; and utilizing control voltage $V_c$ to determine a switching frequency $f_t$ for the inverter and a phase delay $\theta$ for certain components of the inverter.

9. A method in accordance with claim 8 wherein the output of the inverter is a square-wave voltage $V_t$ and switching frequency $f_t$ of the inverter also is the frequency of the square-wave voltage $V_t$ and:

$$f_t = f_0 + f_1 \cdot V_c$$

where $f_0 = \frac{1}{2\pi}(LC)^{1/2}$ and $f_1$ is a positive constant.

10. A method in accordance with claim 9 wherein the phase delay $\theta$ is:

$$\theta = 18° \cdot V_c, \text{ and}$$

the duty cycle $D_t$ of square wave voltage $V_t$ for switching certain components of the inverter is:

$$D_t = \frac{180° - \theta}{180°} \cdot 100\%.$$

11. A series resonant power converter, said converter comprising:

an inverter;

an inductor having an inductance L coupled to the output of said inverter;

a capacitor having a capacitance C coupled in series with said inductor;

a transformer having a primary side and a secondary side, said capacitor coupled to said primary side of said transformer;

a diode bridge coupled to said secondary side of said transformer, said diode bridge configured to supply a power output having a voltage $V_{out}$; and a controller coupled to the output of said diode bridge and configured for controlling, substantially simultaneously, both the frequency and phase delay of said inverter, said controller being configured to:

(a) sample voltage $V_{out}$;

(b) subtract voltage $V_{out}$ from a reference voltage $V_{ref}$ to obtain an error voltage $V_e$;

(c) determine a control voltage $V_c$ by determining the logarithm of error voltage $V_e$ utilizing the relationship:

$$V_c = B \log_{10}(V_e \cdot A)$$

where A and B are constants; and (d) utilize control voltage $V_c$ to determine a switching frequency $f_t$ and a phase delay $\theta$.

12. A power converter in accordance with claim 11 wherein the output of said inverter is a square-wave voltage $V_t$ and switching frequency $f_t$ of said inverter, as determined by said controller, also is the frequency of the square-wave voltage $V_t$ in accordance with:

$$f_t = f_0 + f_1 \cdot V_c$$

where $f_0 = \frac{1}{2\pi}(LC)^{1/2}$ and $f_1$ is a positive constant.

13. A power converter in accordance with claim 12 wherein the phase delay $\theta$ is:

$$\theta = 18° \cdot V_c, \text{ and}$$

the duty cycle $D_t$ of square wave voltage $V_t$ is:

$$D_t = \frac{180° - \theta}{180°} \cdot 100\%.$$

14. A power converter in accordance with claim 11 wherein said inverter comprises four IGBTs.

15. A power converter in accordance with claim 11 wherein said diode bridge comprises four diodes.

16. A power converter in accordance with claim 11 wherein said controller comprises an error amplifier which compares the output voltage of said diode bridge with a predetermined reference voltage $V_{ref}$, and a logarithmic amplifier, the output of said error amplifier being coupled to said logarithmic amplifier.

17. A power converter in accordance with claim 16 wherein said controller further comprises a voltage controlled phase delay and a voltage controlled oscillator, the output of said logarithmic amplifier is coupled to said voltage controlled phase delay and to said voltage controlled oscillator.

18. A power supply, comprising:

a multi-output series-resonant converter, said converter comprising an inverter, an inductor having an inductance L coupled to the output of said inverter, a capacitor having a capacitance C coupled in series with said inductor, a transformer having a primary side and a secondary side, a plurality of outputs provided on said transformer secondary side, said capacitor coupled to said primary side of said transformer, respective diode bridges coupled to said secondary side transformer outputs, said diode bridges configured to supply a power output having a voltage $V_{out}$, respective capacitors coupled across selected ones of the outputs of said diode bridges, respective differential amplifiers coupled across respective ones of said capacitors, outputs of said differential amplifiers coupled to a feedback selector, the output of said feedback selector coupled to a controller configured for controlling, substantially simultaneously, both the frequency and phase delay of said inverter, said feedback selector determining the lowest value voltage supplied thereto by said difference amplifiers and supplying that voltage $V_{out}$ as an input to said controller; and a gradient amplifier coupled to the output of said converter.

19. A power supply in accordance with claim 18 wherein said controller is configured to:

(a) sample voltage $V_{out}$;
(b) subtract voltage $V_{out}$ from a reference voltage $V_{ref}$ to obtain an error voltage $V_e$;
(c) determine a control voltage $V_c$ by determining the logarithm of error voltage $V_e$ utilizing the relationship:

$$V_c = B \log_{10}(v_e \cdot A)$$

where A and B are constants; and (d) utilize control voltage $V_c$ to determine a switching frequency $f_t$ and a phase delay $\theta$.

20. A power supply in accordance with claim 19 wherein the output of said inverter is a square-wave voltage $V_t$ and switching frequency $f_t$ of said inverter, as determined by said controller, also is the frequency of the square-wave voltage $V_t$ in accordance with:

$$f_t = f_0 + f_1 \cdot V_c$$

where $f_0 = \frac{1}{2\pi}(LC)^{1/2}$ and $f_1$ is a positive constant.

21. A power supply in accordance with claim 20 wherein the phase delay $\theta$ is:

$$\theta = 18° \cdot V_c, \text{ and}$$

the duty cycle $D_1$ of square wave voltage $V_t$ is:

$$D_t = \frac{180° - \theta}{180°} \cdot 100\%.$$

22. A power supply in accordance with claim 18 wherein said controller comprises an error amplifier which compares the output voltage of said diode bridge with a predetermined reference voltage $V_{ref}$, and a logarithmic amplifier, the output of said error amplifier being coupled to said logarithmic amplifier.

23. A power supply in accordance with claim 22 wherein said controller further comprises a voltage controlled phase delay and a voltage controlled oscillator, the output of said logarithmic amplifier is coupled to said voltage controlled phase delay and to said voltage controlled oscillator.

* * * * *